(12) United States Patent
Uchide

(10) Patent No.: US 9,219,882 B2
(45) Date of Patent: Dec. 22, 2015

(54) GRAPHICAL USER INTERFACE APPARATUS AND CONNECTION METHOD IN TWO-WAY COMMUNICATION SYSTEM

(71) Applicant: Sony Corporation, Tokyo (JP)

(72) Inventor: Koichi Uchide, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 14/049,902

(22) Filed: Oct. 9, 2013

(65) Prior Publication Data

US 2014/0036026 A1    Feb. 6, 2014

Related U.S. Application Data

(63) Continuation of application No. 11/146,266, filed on Jun. 6, 2005, now Pat. No. 8,589,485.

(30) Foreign Application Priority Data

Jun. 7, 2004   (JP) ................................. 2004-168925

(51) Int. Cl.
| | |
|---|---|
| *G06F 15/16* | (2006.01) |
| *H04N 7/15* | (2006.01) |
| *H04L 29/06* | (2006.01) |
| *H04N 7/14* | (2006.01) |
| *H04L 29/08* | (2006.01) |

(52) U.S. Cl.
CPC ................ *H04N 7/157* (2013.01); *H04L 29/06* (2013.01); *H04L 65/403* (2013.01); *H04L 67/36* (2013.01); *H04N 7/147* (2013.01); *H04L 29/06027* (2013.01); *H04L 69/329* (2013.01)

(58) Field of Classification Search
CPC ...................................................... H04N 7/15
See application file for complete search history.

(56) References Cited

U.S. PATENT DOCUMENTS

| | | | |
|---|---|---|---|
| 5,854,893 A | 12/1998 | Ludwig et al. | |
| 6,192,118 B1 * | 2/2001 | Bayless et al. | 379/201.01 |

(Continued)

FOREIGN PATENT DOCUMENTS

| | | |
|---|---|---|
| JP | 2 89482 | 3/1990 |
| JP | 6 319137 | 11/1994 |

(Continued)

OTHER PUBLICATIONS

Frank Vahid, "The Softening of Hardware," Computer, vol. 36, No. 4, pp. 27-34, Apr. 2003, doi:10.1109/MC.2003.1193225.

(Continued)

*Primary Examiner* — June Sison
(74) *Attorney, Agent, or Firm* — Oblon, McClelland, Maier & Neustadt, L.L.P.

(57) ABSTRACT

A GUI (graphical user interface) apparatus for connecting with a location of a participant by a two-way communication system such as a video conference system. The apparatus includes a display processing device for arranging a plurality of display frames to display still pictures representing specific nominated connection destinations on a screen of display device, a plurality of operation devices arranged on the display frames in a one-to-one relation and a connection processing device for connecting with a particular nominated participant through the network when the operation device arranged corresponding to the display frame, on which the still picture representing the particular nominated participant is displayed, is operated.

10 Claims, 7 Drawing Sheets

(56) References Cited

U.S. PATENT DOCUMENTS

| | | | |
|---|---|---|---|
| 6,781,575 B1* | 8/2004 | Hawkins et al. | 345/173 |
| 7,185,054 B1 | 2/2007 | Ludwig et al. | |
| 7,197,715 B1 | 3/2007 | Valeria | |
| 2001/0003816 A1* | 6/2001 | Kimmo et al. | 707/1 |
| 2002/0076025 A1 | 6/2002 | Liversidge et al. | |
| 2002/0080230 A1 | 6/2002 | Van De Sluis et al. | |
| 2002/0109770 A1* | 8/2002 | Terada | 348/14.08 |
| 2002/0149670 A1* | 10/2002 | Gerszberg et al. | 348/14.01 |
| 2002/0175944 A1 | 11/2002 | Kolde et al. | |
| 2002/0191071 A1 | 12/2002 | Rui et al. | |
| 2003/0236835 A1 | 12/2003 | Levi et al. | |
| 2004/0064510 A1 | 4/2004 | Ooi et al. | |
| 2005/0015444 A1 | 1/2005 | Rambo | |
| 2005/0273494 A1 | 12/2005 | Uchide | |

FOREIGN PATENT DOCUMENTS

| | | |
|---|---|---|
| JP | 8 242307 | 9/1996 |
| JP | 9 152955 | 6/1997 |
| JP | 9 163329 | 6/1997 |
| JP | 2002 238040 | 8/2002 |
| JP | 2003 324705 | 11/2003 |
| KR | 2003-027954-6 | 2/2004 |

OTHER PUBLICATIONS

Steve McConnell, "Who Needs Software Engineering", IEEE Software, vol. 18, No. 1, pp. 5-8, Jan./Feb. 2001, doi:10.1109/MS.2001.903148.

Andrew Tanenbaum, Structured computer organization; ($2^{nd}$ ed.), Prentice-Hall, Inc., Upper Saddle River, NJ 1984.

* cited by examiner

Thumbnail Displayed On
Preset Thumbnail Area 21

GRAPHICAL USER INTERFACE APPARATUS AND CONNECTION METHOD IN TWO-WAY COMMUNICATION SYSTEM

CROSS REFERENCE TO RELATED APPLICATIONS

This application is a continuation of U.S. Ser. No. 11/146,266, filed Jun. 6, 2005, which claims priority under 35 U.S.C. 119 to Japanese Application No. 2004-168925 filed Jun. 7, 2004, the entire contents of both of which are incorporated herein by reference.

BACKGROUND OF THE INVENTION

1. Field of the Invention

The present invention relates generally to a GUI (graphical user interface) apparatus and a connection method in a two-way communication system such as a video conference system, and particularly to a GUI apparatus and a connection method by which a user can connect with the parties being communicated frequently with ease.

2. Description of the Related Art

A system in which users are able to communicate with each other in a two-way communication fashion while watching their faces by transmitting images respectively shot between two distant spots to the spots of the parties being communicated through a network is being widespread. A video conference system can be enumerated as an example of such a two-way communication system.

As the GUI in such video conference system, there has so far been proposed a GUI in which icons of personal information of the parties being joined to the video conference of its own video conference room (first video conference room) and a video conference room of the parties being communicated (second video conference room) and icons of equipment of its own video conference room and those of the video conference room of the parties being communicated are displayed on the screen before a video conference is started, for example (see Cited Patent Reference 1, for example).

[Cited Patent Reference 1]: Official Gazette of Japanese laid-open patent application No. 2001-331429 (paragraph Nos. [0052] to [0057], [0182] to [0189], FIGS. 4, 5, 40, 41)

The above-described patent reference 1 has described an example in which a video conference is held between only the two spots of the first and second video conference rooms. However, in actual practice, it is frequently observed that video conference devices are installed at a large number of spots (for example, a large number of domestic and foreign branches and business places of one company) connected via a network, a video conference being held between arbitrary two spots of a number of spots.

In that case, at individual locations, names and addresses (IP addresses) of a large number of remaining locations are stored in a memory of a computer, for example, in a constant sequential order (for example, in an alphabetical order such as names of locations, etc.) as an address book. Then, when a user wants to hold a video conference with the participant being communicated at a certain location, the user opens the address book to find out a location of the participant being communicated in video conference and operates a video conference device to connect with that location via a network.

However, from a standpoint of individual spots, it is customary for a large number of remaining spots to hold relatively frequently a video conference with a part of spots (business place which handles the same project within the company), they rarely hold a video conference between them and the greater part of remaining spots.

When the parties being frequently communicated for video conference and other parties are distinguished from each other as described above, it is cumbersome for the user to operate the video conference device and also it takes a plenty of time to connect with the parties being communicated each time the user opens the address book to find out the party being communicated from a large number of spots in order to hold a video conference with the parties being frequently communicated for the video conference.

SUMMARY OF THE INVENTION

In view of the aforesaid aspects, the present invention intends to provide a GUI (graphical user interface) apparatus and a connection method in which connection to the party being frequently communicated can be easily established in a two-way communication system such as a video conference system.

According to an aspect of the present invention, there is provided a graphical user interface apparatus for connecting with a location of the participant being connected for use with a two-way communication system in which a shot image is transmitted through a network to the location of the participant being connected, an image received from the location of the participant being connected through the network being displayed. This graphical user interface apparatus is composed of a display processing device for arranging a plurality of display frames to display still pictures representing specific nominated connection destinations on a screen of a display device, a plurality of operation devices arranged on the display frames in a one-to-one relation and a connection processing device for connecting with the nominated connection destination represented by the still picture displayed on the display frame through the network each time the operation device located at the position corresponding to any of the display frame on which the still picture is displayed is operated.

According to this graphical user interface apparatus, a plurality of display frames to display still pictures representing specific nominated parties being connected is arranged on the screen of the display device. Also, there are provided a plurality of operation devices arranged on the display frames in a one-to-one relation. Then, when the operation device at the arrangement position corresponding to any of the display device with the still picture being displayed is operated, a user is connected to the nominated party being connected represented by the still picture displayed on the display frame through the network by the connection processing device.

Accordingly, if only the still picture representing a part of the participants being frequently communicated of a large number of locations (for example, head office and many domestic and foreign branches and business places of one company) connected through the network is displayed on the display frames, when the user presses the operation device at the arrangement position corresponding to the display frame in which the still picture representing the participant being connected this time while watching the arrangement of the display frames, the user is connected to the location of the participant being connected through the network to start two-way communication with the participant being connected. Thus, it is possible for the user to easily connect with the participant being communicated frequently.

Also, in this graphical user interface apparatus, by way of example, this graphical user interface apparatus further includes a capture device for capturing a still picture received through the network from a location of the participant being connected and a memory device for storing a still picture captured by the capture device and wherein the display processing device displays the still picture stored in the memory device after it was captured by the capture device during connection each time the operation device located at the position corresponding to any of the display frame is operated during the graphical user interface apparatus is being connected to any participant being connected or immediately after the connection was ended.

As a result, during the user is being connected with the party being frequently communicated or immediately after the connection was ended, the still picture captured from the image of the party being connected is displayed on this display frame and hence it becomes possible for the user to easily connect with the party being communicated from now on.

Also, in this graphical user interface apparatus, by way of example, this graphical user interface apparatus further includes a capture device for capturing a still picture received through the network from a location of the participant being connected, a memory device for storing a still picture captured by the capture device and a selection picture display processing device for displaying a selection picture to select anyone of the display frames when an address book in which the participants being connected in the past are registered is displayed and wherein the display processing device displays a still picture, stored in the memory device after it was captured by the capture device, on the selected display frame when the apparatus is connected to the participant being selected based on the fact that any participant being connected is selected from the address book when the selection picture is displayed by the selection picture display processing device and that the display frame is selected by the selection picture.

Consequently, of a large number of the parties being communicated entered in the address book, the still picture captured from the image of the party being frequently communicated is displayed on the display frame, whereby the user becomes able to easily connect with the party being communicated from now on.

Also, in this graphical user interface apparatus, by way of example, the display processing device further includes tabs provided on the screen to display a plurality of still pictures on the display frames and an operation device for switching the tabs.

Consequently, even when the number of the parties being frequently communicated exceeds the number of the display frames, it becomes possible to display still pictures representing the parties being communicated by switching the tabs.

According to another aspect of the present invention, there is provided a connection method for connecting with a location of the participant being connected for use with a two-way communication system in which a shot image is transmitted through a network to the location of the participant being connected, an image received from the location of the participant being connected through the network being displayed. This connection method is composed of the steps of a display step for arranging a plurality of display frames to display still pictures representing specific nominated participants being connected on a screen of a display device, an operation step for operating a plurality of operation devices arranged on the display frames in a one-to-one relation and a connection step for connecting with the nominated participants being connected represented by the still picture displayed on the display frame through the network each time the operation device located at the position corresponding to any of the display frame on which the still picture is displayed is operated.

In a connection method for use with a two-way communication system according to the present invention, this connection method further includes the steps of a capture step for capturing a still picture received through the network from a location of the participant being connected and a memory step for storing a still picture captured at the capture step and wherein the display step displays the still picture stored at the memory step after it was captured at the capture step during connection each time the operation means located at the position corresponding to any of the display frame is operated during the two-way communication system is being connected to any participant being connected or immediately after the connection was ended.

Furthermore, in a connection method for use a two-way communication system according to the present invention, this connection method further includes the steps of a capture step for capturing a still picture received through the network from a location of the participant being connected, a memory step for storing a still picture captured at the capture step and a selection picture display step for displaying a selection picture to select anyone of the display frames when an address book in which the persons being connected in the past are registered is displayed and wherein the display step displays a still picture, stored at the memory step after it was captured at the capture step, on the selected display frame when the two-way communication system is connected to the participant being selected based on the fact that any participant being connected is selected from the address book when the selection picture is displayed at the selection picture display step and that the display frame is selected by the selection picture.

In this connection method, a plurality of display frames to display still pictures representing specific nominated parties being connected is arranged on the screen of the display device. Also, there are provided a plurality of operation devices arranged on the display frames in a one-to-one relation. Then, when the operation device at the arrangement position corresponding to any of the display device with the still picture being displayed is operated, a user is connected to the nominated party being connected represented by the still picture displayed on the display frame through the network by the connection processing means.

Accordingly, if only the still picture representing a part of the parties participants being frequently communicated of a large number of locations connected through the network is displayed on the display frames, when the user presses the operation device at the arrangement position corresponding to the display frame in which the still picture representing the participant being connected this time while watching the arrangement of the display frames, the user is connected to the location of the participant being connected through the network to start two-way communication with the participant being connected. Thus, it is possible for the user to easily connect with the participant being communicated frequently.

According to the present invention, while watching the arrangement of the display frames on which still pictures representing the participants being frequently communicated are displayed of a large number of locations (for example, domestic and foreign branches and business places of one company) connected via the network, if the user operates the operation means of the arrangement position corresponding to the display frame on which a still picture representing the participant being communicated this time, then the user can be connected to the location of the participant being communicated and the user can start two-way communication with the participant being communicated. In consequence, there can be achieved an effect that the user can easily connect with the participant being communicated frequently in the two-way communication such as video conference system.

Also, there can be achieved an effect in which it becomes possible for the user to easily connect with the party being communicated next time by displaying a still picture captured from an image of the party being communicated on this display frame during the user is being connected with the party being communicated frequently or immediately after the connection.

Further, there can be achieved an effect in which it becomes possible for the user to easily connect with the party being communicated next time by displaying a still picture captured from an image of the party being communicated frequently on the display frame from a large number of the parties being communicated entered on the address book.

Furthermore, there can be achieved an effect in which still pictures of the parties being communicated can be displayed on these display frames even when the number of the parties being communicated frequently exceeds the number of the display frames.

DESCRIPTION OF THE PREFERRED EMBODIMENTS

An embodiment in which the present invention is applied to a video conference system will now be described with reference to the drawings.

Figure 1:
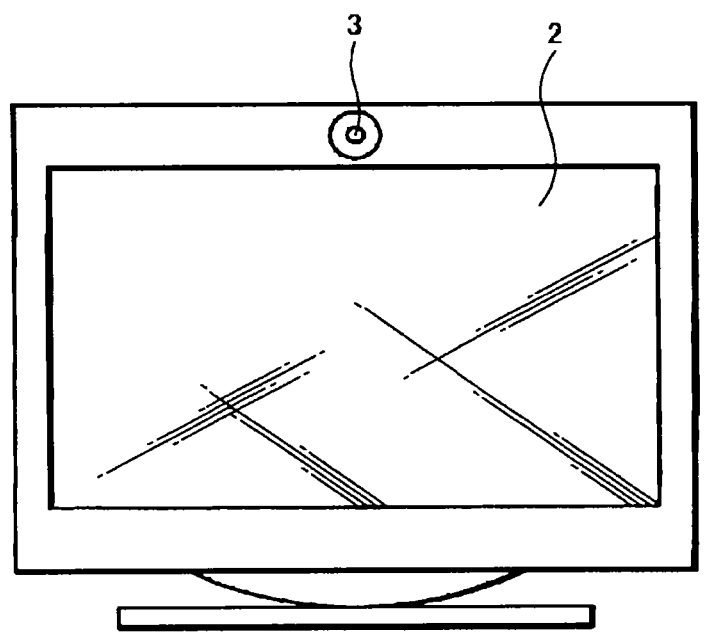
FIG. 1 is a front view showing a video conference system to which the present invention is applied.

FIG. 1 of the accompanying drawings is a front view showing an outside appearance of a video conference apparatus to which the present invention is applied. This video conference apparatus 1 has a display, a video camera, a microphone, a speaker, a codec, a communication interface and the like integrated as one body. As shown in FIG. 1, the video conference apparatus 1 includes an LCD (liquid-crystal display) 2 and a video camera 3 provided on the front thereof.

Figure 2:
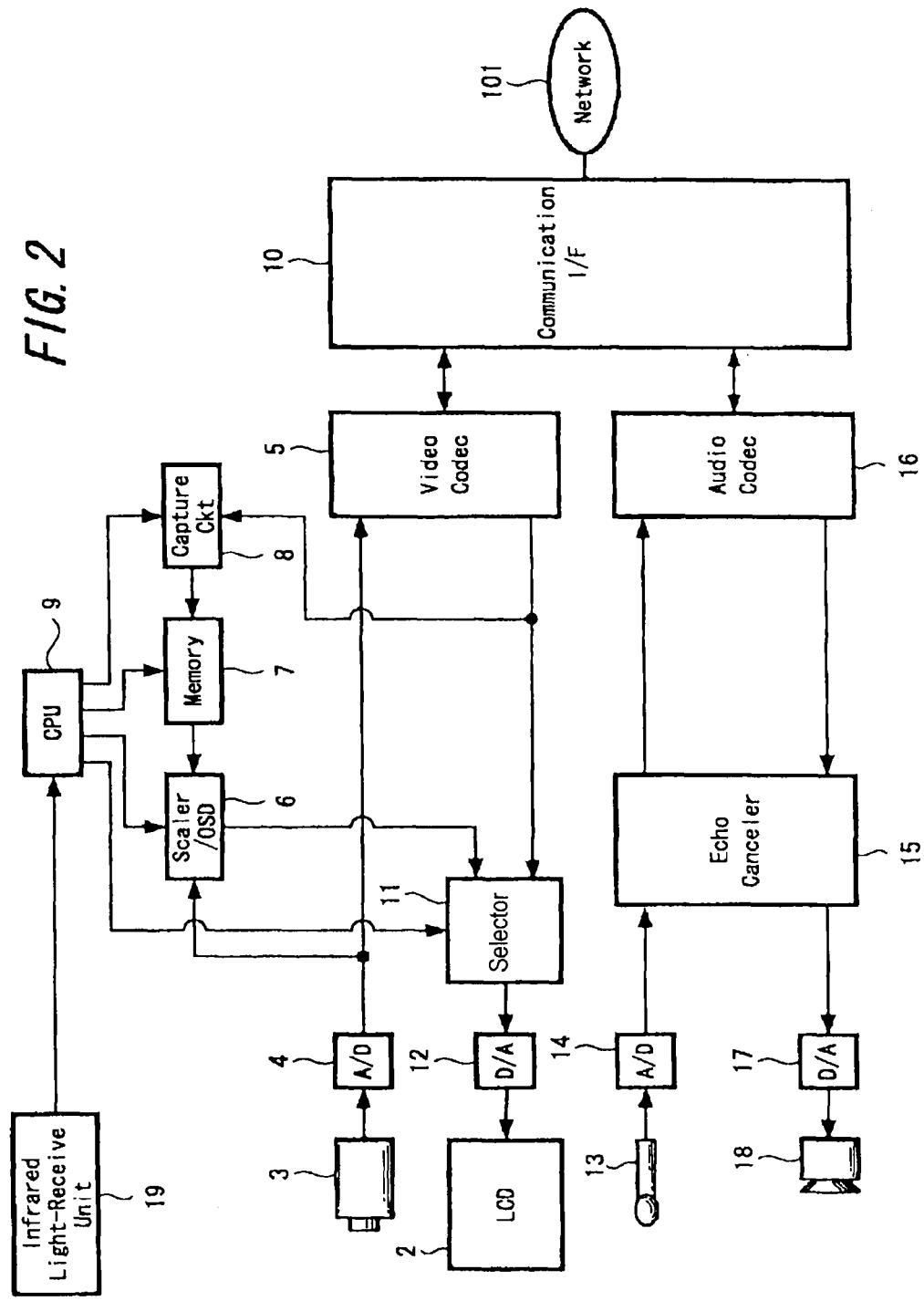
FIG. 2 is a block diagram showing an arrangement of the video conference apparatus shown in FIG. 1.

FIG. 2 is a block diagram showing a circuit arrangement of this video conference apparatus 1. In FIG. 2, elements and parts identical to those of FIG. 1 are denoted by identical reference numerals.

As shown in FIG. 2, a video signal outputted from the video camera 3 is supplied to an A/D (analog-to-digital) converter 4, in which it is converted into a digital video signal. Then, the digital video signal from the A/D converter 4 is coded (compressed) by a video codec 5 and supplied to a communication interface 10. The communication interface 10 is connected to a network (the Internet or intranet) 101.

The digital video signal from the A/D converter 4 is also supplied to a scaler/OSD (on-screen display) circuit 6. The scaler/OSD circuit 6 is a circuit for reducing an image size of an inputted video signal and it is also able to create a top picture, an address book picture, a menu picture and the like by embedding this reduced video signal into image data generated based on character information and color information instructed from a CPU (central processing unit) 19.

Video data received at the communication interface 10 from the network 101 is supplied to a video codec 5, in which it is decoded (expanded). The thus decoded video signal from the video codec 5 is supplied to a selector 11 and a capture circuit 8. The capture circuit 8 is adapted to capture still picture data from the decoded video signal. The still picture data captured by the capture circuit 8 is stored in the memory circuit 7. The memory 7 has a storage capacity capable of storing still picture data corresponding to a large number of (for example, more than still pictures) still pictures. The still picture data read out from the memory 7 also is supplied to the scaler/OSD circuit 6.

Image data outputted from the scaler/OSD circuit 6 is supplied to a selector 11. A selected output from the selector 11 is supplied to a D/A converter 12, in which it is converted into an analog video signal and it is displayed on the LCD 2.

An audio signal outputted from a microphone 13 is supplied to an A/D converter 14, in which it is converted into a digital audio signal. The digital audio signal from the A/D converter 14 is supplied to an audio codec 16, in which it is coded and supplied to the communication interface 10. Audio data received at the communication interface 10 from the network 101 is supplied to the audio codec 16, in which it is decoded. Then, the decoded audio data from the audio codec 16 is supplied through an echo canceller 15 to a D/A converter 17, in which it is converted into an analog audio signal and supplied to a speaker 18.

Also, this video conference apparatus 1 can be operated under control of an infrared remote controller (not shown) and a command signal received at an infrared light-receiving unit 19 is supplied to a CPU (central processing unit) 9. The CPU 9 controls respective units of the video conference apparatus 1 based on this command signal. In FIG. 2, control lines other than the lines from the CPU 9 to the scaler/OSD circuit 6, the memory 7, the capture circuit 8 and the selector 11 are not shown.

Figure 3:
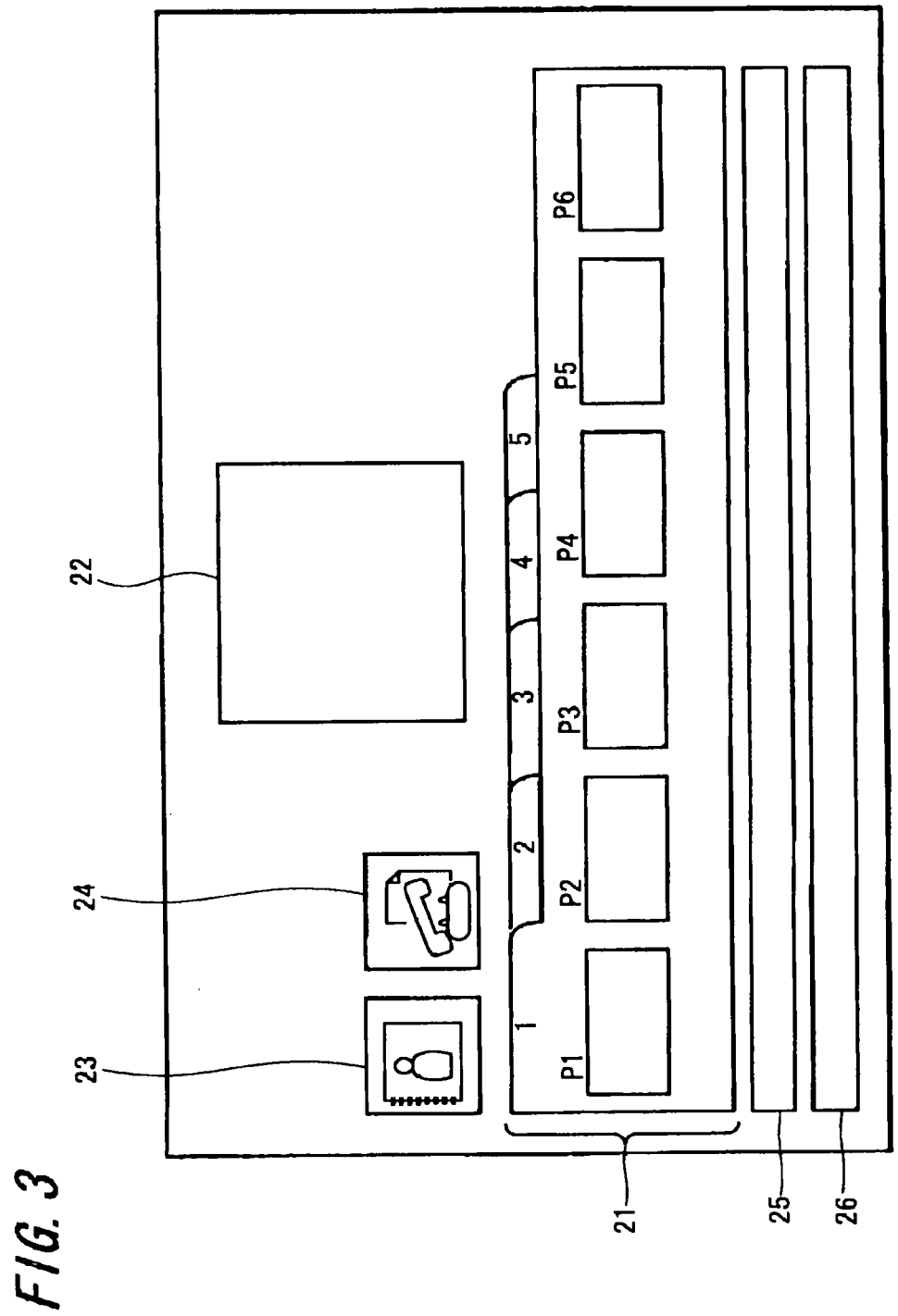
FIG. 3 is a pictorial representation showing a top picture displayed on the video conference apparatus shown in FIG. 2.

FIG. 3 shows a top picture displayed on the LCD 2 of this video conference apparatus 1. When the power switch of the video conference apparatus 1 is turned on, this top picture is created by the scaler/OSD circuit 6 and selected by the selector 11, whereafter it is displayed on the LCD 2. This top picture is provided with a preset thumbnail area 21. Six display frames, represented as "P1" to "P6", to display thumbnail images are arranged in the lateral direction of the preset thumbnail area 21. Tabs represented by tab numbers "1" to "5" to display five still pictures exist on these display frames "P1" to "P6".

The top picture further includes a self display area 22 to display a self image (image shot by the video camera 3 shown in FIGS. 1 and 2 and supplied to the scaler/OSD circuit 6), an address book icon 23 to display an address book on which the parties being connected in the past are registered, a dial icon 24, an address input area 25 to directly input an address (IP address and the like) of the party being connected and a message display area 26 to display various messages.

Figure 4:
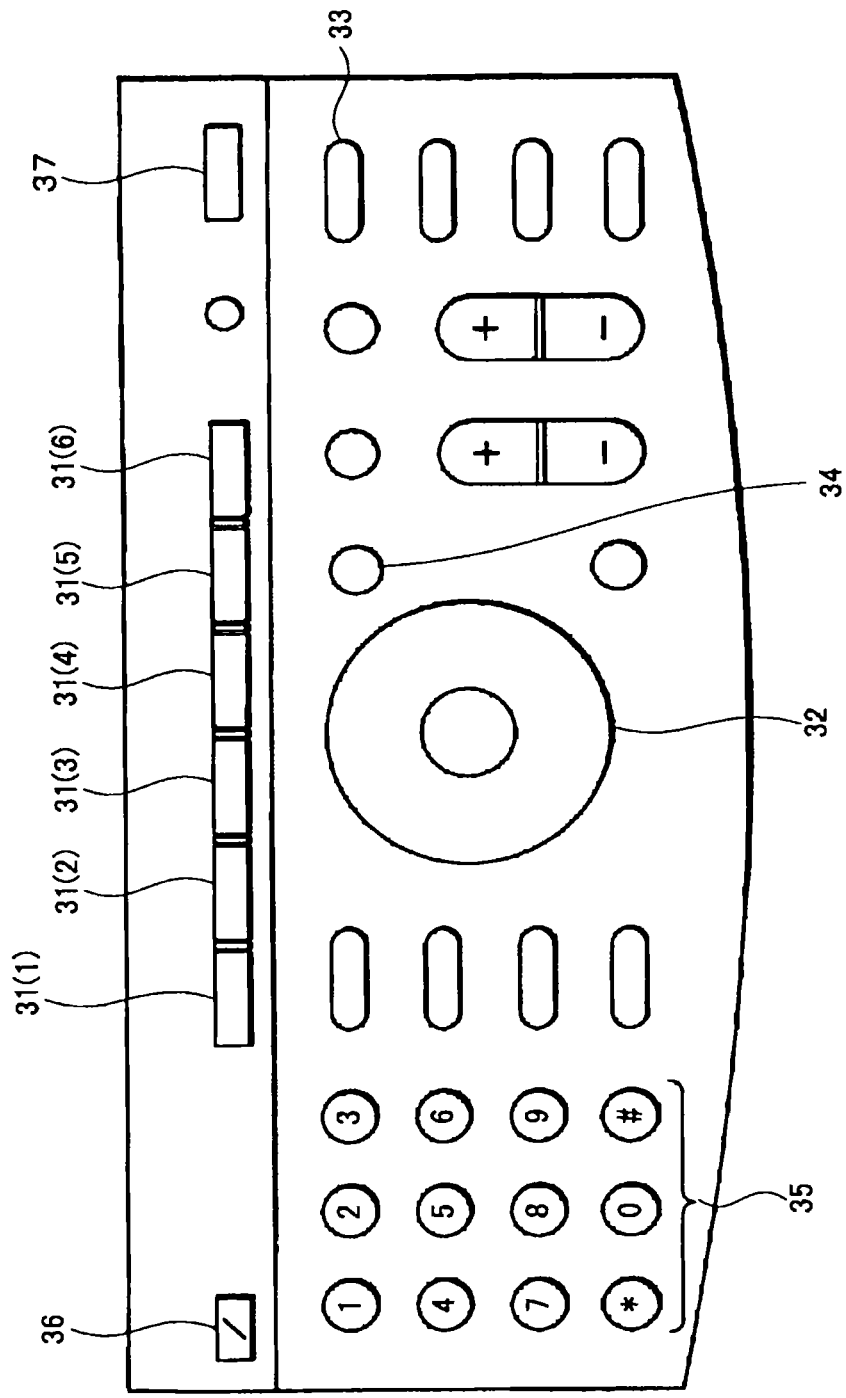
FIG. 4 is a top view showing a remote controller to operate the video conference apparatus shown in FIG. 1.

FIG. 4 is a plan view showing an outside appearance of an infrared remote controller 30 to operate this video conference apparatus 1. This infrared remote controller 30 includes six one-touch dial keys 31(1) to 31(6) arranged thereon in the lateral direction in a one-to-one relation to the six display frames "P1" to "P6" of the preset thumbnail area 21 on the top picture shown in FIG. 3.

Also, the infrared remote controller 30 includes a cursor key 32. The cursor key 32 is adapted to move a cursor when it is inclined in the upper and lower direction and right and left direction. The cursor key 32 is also able to decide the cursor position when the central portion thereof is pressed. In the top picture shown in FIG. 2, when this cursor key 32 is inclined in the right and left direction, the cursor key 32 is able to sequentially switch the tab numbers "1" to "5" of the preset thumbnail area 21 and it is also able to click the address book icon 23 and the dial icon 24.

Referring back to FIG. 4, the infrared remote controller 30 includes a capture key 33 to capture a picture of the party being communicated as a still picture during the video conference.

In addition, the infrared remote controller 30 further includes various keys similar to those of a remote controller for use with an ordinary video conference apparatus, such as a menu key 34, a ten key 35, a dial key 36 and a power supply key 37.

Still pictures are not yet displayed on the display frames "P1" to "P6" of the preset thumbnail area 21 of the top picture in the initial state. Still pictures can be displayed on the display frames "P1" to "P6" by the following two methods. In the following description, the manner to display new still pictures on the display frames "P1" to "P6" is referred to as a "one-touch dial entry".

"One-Touch Dial Entry from Top Picture"

Figure 5:
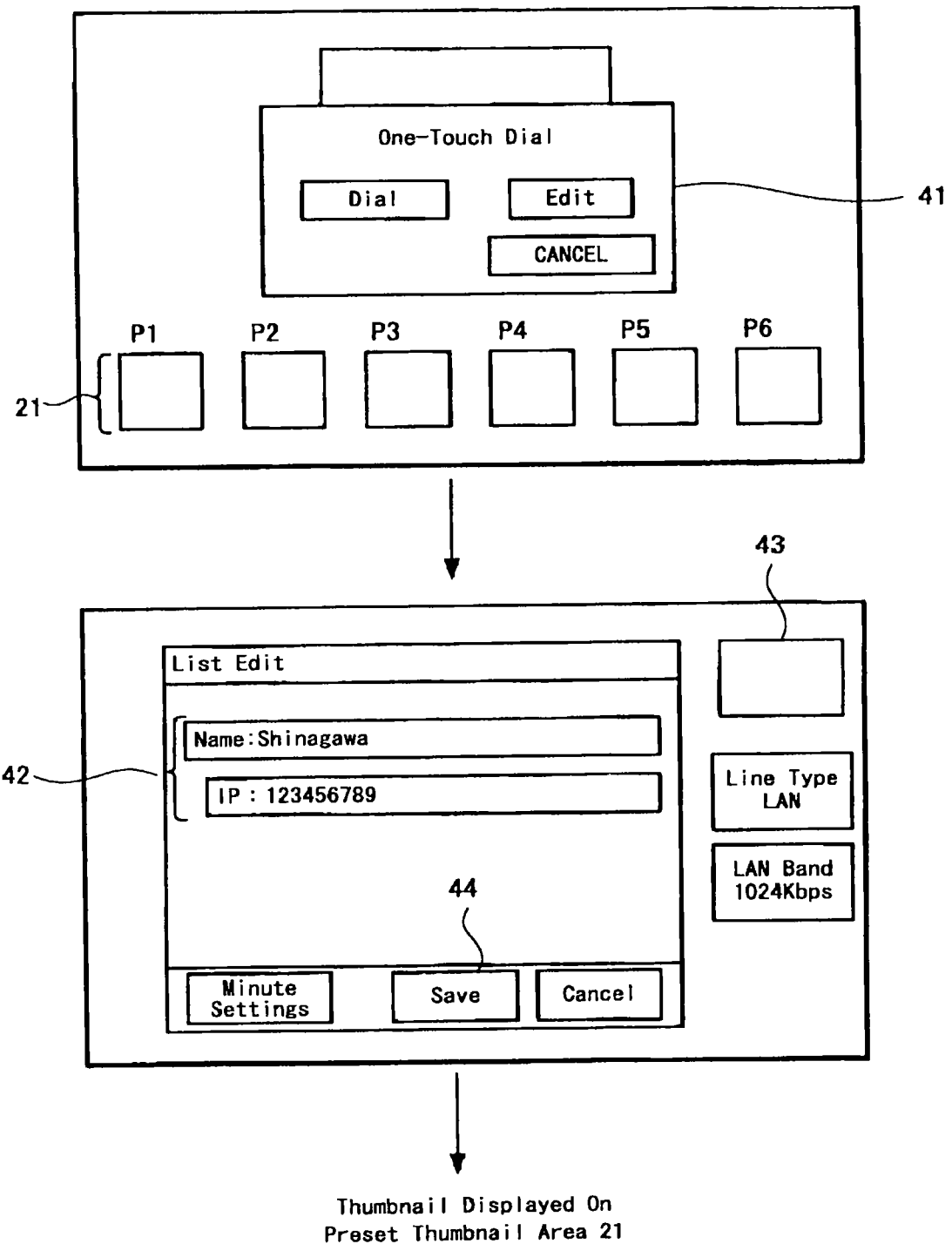
FIG. 5 is a schematic diagram showing processing in which the party being communicated is registered on a preset thumbnail area.

FIG. 5 is a pictorial representation showing a method for making a one-touch dial entry from top picture. As an ordinary connection method for connecting a user to the location of the participant being communicated in this video conference apparatus 1, there are a method in which a user presses the dial key 36 or the user clicks the dial icon 24 with the cursor key 32 (FIG. 4) after the user entered an address of the participant being communicated into the address input area 25 (FIG. 3) with the ten key 35 (FIG. 4) of the infrared remote controller 30 or a method in which a user clicks the address book icon 23 (FIG. 3) with the cursor key 32 to open the address book picture, the user selecting the participant being communicated on the address book picture to connect the participant being communicated.

During the user is doing video conference after the user is connected to the location of the participant being communicated through the network 101 (FIG. 2) by one of the above-mentioned two methods or immediately after the end of such connection (within a constant time such as several minutes, for example, at the completion of the connection), when a user displays a top picture by the menu key 34 (FIG. 4) and operates any of the one-touch dial keys 31(1) to 31(6) at the arrayed position corresponding to any of the display frames "P1" to "P6" of the preset thumbnail area 21 (FIG. 3) in which a still picture is not yet displayed (by way of example, one-touch dial key 31(1) of the arrayed position corresponding to the display frame "P1", the CPU 9 (FIG. 2) within the video conference apparatus 1 generates a picture of a submenu concerning the one-touch dial on the scaler/OSD circuit 6 (FIG. 2) and thereby this submenu is displayed on the top picture. The upper row of FIG. 5 pictorially represents the state in which this sub-menu 41 is displayed on the top picture.

When the user selects "EDIT" from the sub-menu 41 with the cursor key 32, the CPU 9 generates an edit picture for the one-touch dial entry on the scaler/OSD circuit 6 (FIG. 2) and thereby this edit picture is displayed on the top picture. A lower row of FIG. 5 pictorially represents this edit picture.

As shown in FIG. 5, this edit picture includes an input area 42 for entering the name and address (IP address, etc.) of the party being entered in a one-touch dial fashion, a thumbnail display area 43 for displaying the thumbnail of the party being communicated, an icon 44 for deciding the entry and the like.

During video conference, when the user presses the capture key 33 (FIG. 4) at a proper timing while watching the face of the party being connected through the LCD 2 (FIGS. 1 and 2), under control of the CPU 9, a still picture of the face of the party being connected is captured by the capture circuit 8 (FIG. 2) and the captured still picture is stored in the memory 7 (FIG. 2). When the edit picture on the lower row of FIG. 5 is displayed, under control of the CPU 9, the still picture of the face of the party being connected is read out from the memory 7, the thus read out still picture is reduced in size by the scaler/OSD 6 (FIG. 2) and thereby displayed on the thumbnail display area 43 (FIG. 5).

Then, when the user clicks the icon 44 (FIG. 5) with the cursor key 32 (FIG. 4) after the user entered data into the input area 42 with the ten key 35, the CPU 9 stores the display frame "P1" of the preset thumbnail area 21 of the top picture and the present tab number (by way of example, the tab number "1"), the still picture of the face of the party being connected, the name and address (name and address inputted to the input area 42) in association with each other. Thus, the one-touch dial entry is completed.

When the top picture is displayed after the next time, under control of the CPU 9, the still picture of the face of the party being connected is read out from the memory 7, the still picture is reduced in size by the scaler/OSD circuit 6 and the display frame "P1" of the tab number "1" is displayed on the preset thumbnail area 21. Also, under control of the CPU 9, character data of the name of the party being connected is generated from the scaler/OSD circuit 6 and the name of the party being connected also is displayed together with the display frame "P1" of the tab number "1".

"One-Touch Dial Entry from Address Book"

Figure 6:
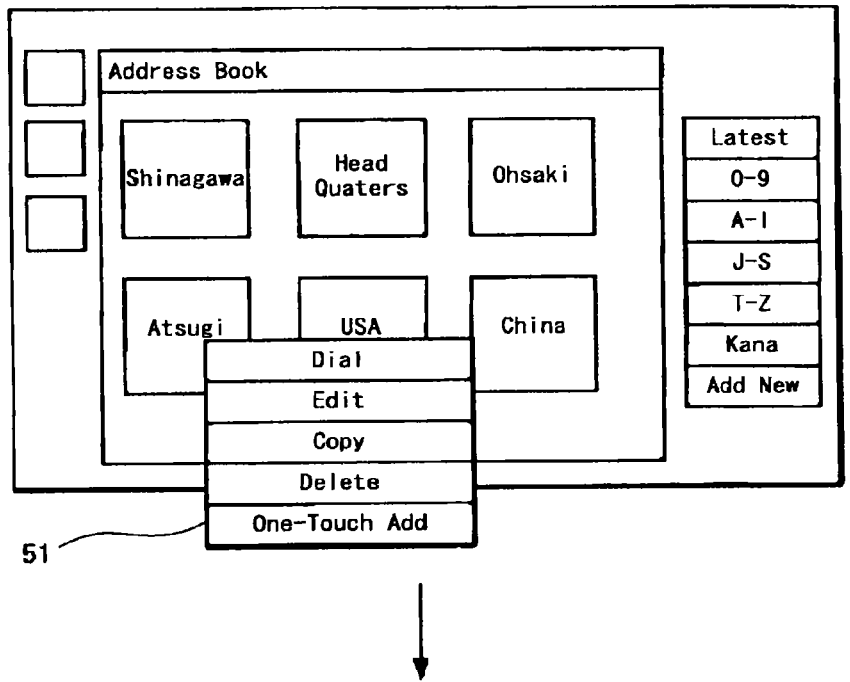
FIG. 6 is a schematic diagram showing another processing in which the party being communicated is registered on a preset thumbnail area.
Figure 6:
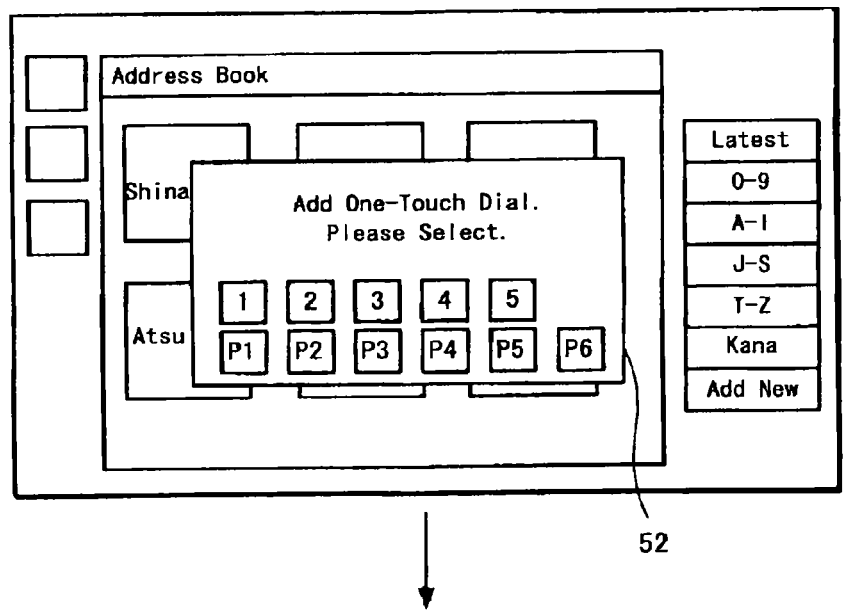

FIG. 6 is a schematic diagram showing a method for doing a one-touch dial entry from an address book. When the user clicks the address book icon 23 of the top picture with the cursor key 32 as mentioned before, under control of the CPU 9, an address book picture is created by the scaler/OSD circuit 6 and this address book picture is displayed on the LCD 2 (FIG. 2). An upper row of FIG. 6 shows this address book picture. As shown in FIG. 6, the entered names of the parties being connected ("SHINAGAEA", "HONSYA", etc.) of the predetermined number are displayed and sub-menus 51 such as "DIAL", "EDIT", . . . "ONE-TOUCH ENTRY" are displayed.

When the user selects the party being connected by clicking a desired name and clicks "DIAL" of the sub-menu 51, the CPU 9 controls the communication interface 10 (FIG. 2) so that the user may be connected to the address of the party being connected through the network 101 (FIG. 2).

Also, when the user clicks "EDIT" on the sub-menu 51, under control of the CPU 9, an edit picture (not shown) for doing new entry to the address book is created by the scaler/OSD circuit 6 and this edit picture is displayed on the LCD 2 (FIG. 2).

When the user selects the party being connected by clicking a desired name and clicks "ONE-TOUCH ENTRY" of the sub-menu 51, under control of the CPU 9, a selection picture to select the one-touch entry of the party being connected is generated from the scaler/OSD circuit 6 and thereby this selection picture is displayed on the LCD 2 (FIG. 2). A lower row in FIG. 6 pictorially represents this selection picture.

As shown in FIG. 6, tab numbers "1" to "5" and the icons of the display frames "P1" to "P6" of the preset thumbnail area 21 (FIG. 3) are displayed on this selection picture 52. When the user clicks a combination of the tab numbers "1" to "5" and the display frames "P1" to "P6" in which no still picture is displayed at present (by way of example, the display frame "P2" of the tab number "1") with the cursor key 32, the CPU 9 stores the tab number "1" and the display frame "P2" of the preset thumbnail area 21, a still picture of the face of the party being connected (still picture stored in the memory 7 after it was captured by the capture circuit 8 in association with operation of the capture key 33 when the user was connected to the party being connected in the past), a name and an address (name and address entered on the address book) in association with each other. Thus, the one-touch dial entry is completed.

Then, when the top picture is displayed after the next time, under control of the CPU 9, a still picture of the face of the party being connected is read out from the memory 8, the thus read out still picture is reduced in size by the scaler/OSD circuit 6 and the reduced still picture is displayed on the display frame "P2" of the tab number "1" of the present thumbnail area 21. Also, under control of the CPU 9, the name of the party being connected is also displayed on the display frame "P2" of the tab number "1".

Figure 7:
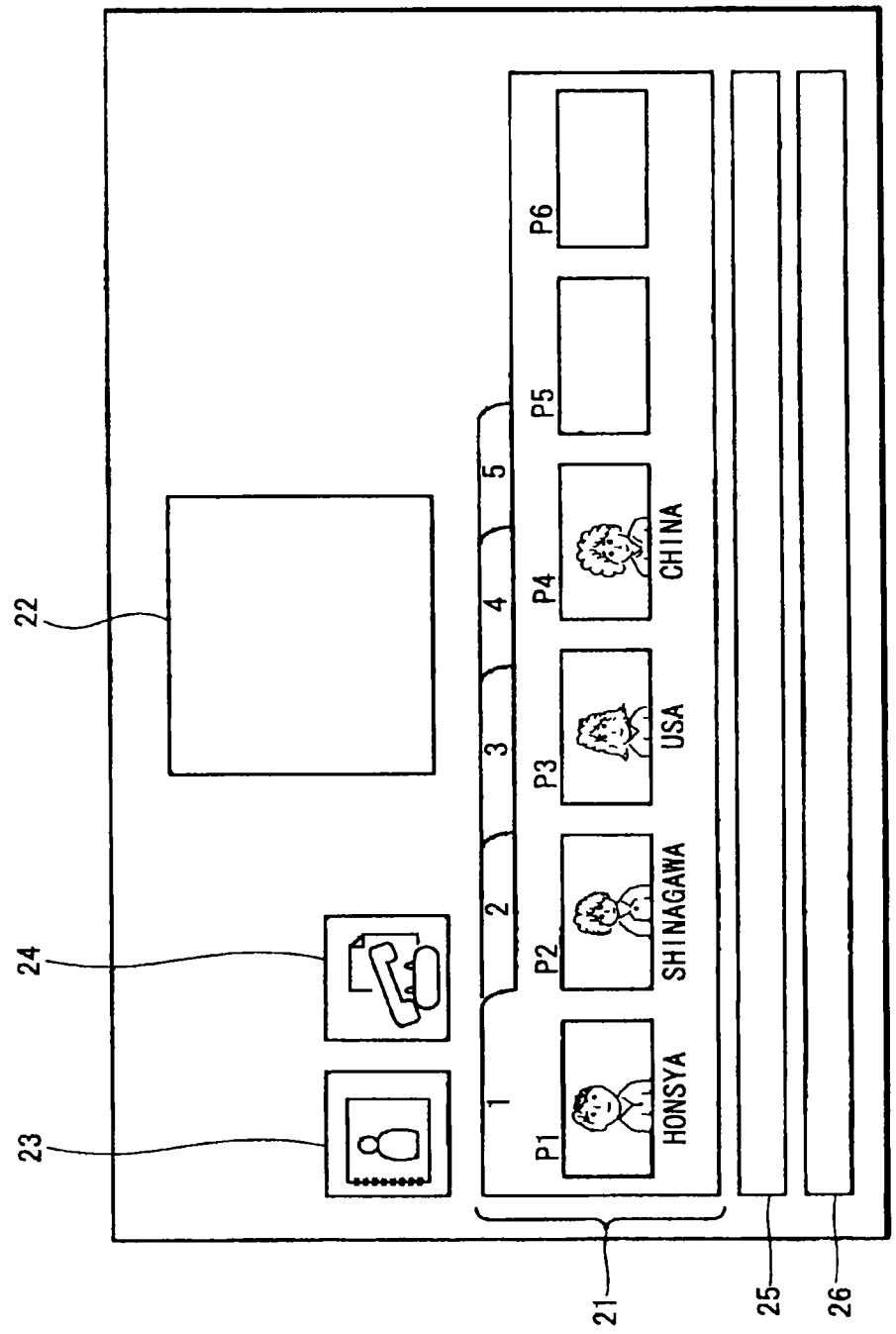
FIG. 7 is a pictorial representation showing the manner in which the parties being communicated are registered on the preset thumbnail area shown in FIG. 3.

FIG. 7 is a pictorial representation showing an example of a top picture displayed after the one-touch dial entry was done by the method that has been described so far. As shown in FIG. 7, in this example, still pictures of the faces of the nominated parties being connected and names of the parties being connected (names of companies and the like to which the parties being connected belong, such as "HONSYA (HEAD OFFICE)", "SHINAGAWA (SHINAGAWA) are displayed on the display frames "P1", "P2", "P3" and "P4" of the tab number "1" of the preset thumbnail area 21.

When the user presses the one touch dial key 31(1) of the arrayed position corresponding to the display frame "P1" of the one touch dial keys 31(1) to 31(6) (FIG. 4) of the infrared remote controller 30 in order to do video conference between the user and the head office of which still picture is displayed on the display frame "P1" of the tab number "1", for example, while watching the arrangement of the display frames "P1" to "P6" of the preset thumbnail area 21 on the top picture, the CPU 9 (FIG. 2) within the video conference apparatus 1 reads out the address of the party being connected stored in the memory 7 (FIG. 2) in association with the display frame "P1" of the tab number "1" upon one touch dial entry and controls the communication interface 10 (FIG. 2) such that the user may be connected to the address of the party being connected through the network 101 (FIG. 2). Thus, it is possible to start video conference between the user and the head office.

As described above, in this video conference apparatus 1, a plurality of display frames "P1" to "P6" to display still pictures representing specific nominated parties being connected is arranged on the preset thumbnail area 21 on the screen of the LCD 2. Also, a plurality of one touch dial keys 31(1) to 31(6) arranged in response to the display frames "P1" to "P6" in a one-to-one relation is provided on the remote controller 30. Then, based on depression of one touch dial key at the arrangement position corresponding to any display frame, of the arrangement of the display frames "P1" to "P6", in which a still picture is displayed, the user is connected to the nominated party being connected represented by the still picture displayed on the display frame through the network 101.

Accordingly, if only the still picture representing a part of the participants being connected to frequently join the video conference of a large number of locations (for example, head office and many domestic and foreign branches and business places of one company) connected through the network 101 is displayed on the display frames "P1" to "P6", when the user presses the one touch dial key at the arrangement position corresponding to the display frame in which the still picture representing the participant being connected to join the video conference this time while watching the arrangement of the display frames "P1" to "P6", the user is connected to the location of the participant being connected through the network 101 to start video conference with the participant being connected. Thus, it is possible for the user to easily connect with the participant being connected to join the video conference frequently.

Also as shown in FIG. 6, when the address book in which the parties being connected in the past are entered is displayed, the selection picture 52 to select any tab number and display frame of the tab numbers "1" to "5" and the display frames "P1" to "P6" of the preset thumbnail area 21 is displayed, any of the party being connected is selected from this address book and the tab number and the display frame are selected on the selection picture 52, whereby the still picture captured by depression of the capture key 33 when the user is connected with the selected party being connected is displayed on the selected display frame in the selected tab number of the present thumbnail area 21.

Accordingly, of a large number of parties being connected entered on the address book, the still pictures captured from the pictures of the parties being connected to frequently join the video conference can be displayed on the display frames "P1" to "P6". Thus, it is possible for the user to easily connect with the parties being connected from now on.

Also, the preset thumbnail area 21 includes the tabs with the tab numbers "1" to "5" to display five still pictures on the display frames "P1" to "P6" and the tabs "1" to "5" can be switched with the cursor key 32 of the infrared remote controller 30.

Accordingly, even when the number of the parties being connected to frequently join the video conference exceeds the number of the display frames "P1" to "P6", thirty still pictures representing the parties being connected can be displayed on the display frames "P1" to "P6" at maximum.

In the above-mentioned example, the user is connected with only one spot by depressing the one touch dial keys 31(1) to 31(6) of the arrangement position corresponding to any one of the display frames "P1" to "P6" of the preset thumbnail area 21 as set forth above. However, a form of the video conference is not limited to the above-mentioned form but there exists a form in which a certain spot can be connected with more than two spots at the same time (multi-point connection). Accordingly, for example, it is possible for the user to connect with spots of more than two parties being connected represented by still pictures displayed on the display frames by sequentially pressing one touch dial keys 31(1) to 31(6) of the arrangement positions corresponding to the more than two display frames "P1" to "P6" of the preset thumbnail area 21.

As a consequence, it is possible for the user to start video conference with the parties being connected by sequentially pressing one touch dial keys of the arrangement positions corresponding to the display frames in which still pictures representing more than two parties being connected to join the video conference in a multi-point connection this time are displayed. When video conference is held in a multi-connection fashion according to the related art, it is customary for the user to open the address book to select the parties being connected from a large number of spots. Thus, when entry positions of the parties being connected are distant from each other in the address book (for example, alphabets of names of the parties being connected are different), it takes a plenty of time to select all parties being connected. On the other hand, according to the video conference apparatus 1, it becomes easy for the user to connect with more than two parties being connected required when the video conference is held in a multi-point connection fashion.

While the numbers of the display frames and the tabs on the preset thumbnail area 21 are respectively set to 5 and 6 in the above-mentioned example, the numbers of the display frames and the tabs are not limited to 5 and 6 and they can be changed properly and freely.

The present invention is applied to the video conference apparatus 1 in which the infrared remote controller 30 is provided independently of the apparatus main body as described above. The present invention is not limited thereto and the following variant is also possible. That is, in a video conference apparatus 1 in which a control panel is provided on a video conference apparatus main body, six one touch dial keys arranged in response to the display frames "P1" to "P6" in a one-to-one relation may be provided on the control panel. Alternatively, the LCD 2 may be replaced with a touch panel display and the user may be connected with the location of the participant being connected represented by a still picture displayed on the display frame through the network by touching the display frames "P1" to "P6" on the screen with a finger.

The present invention is applied to the video conference apparatus 1 in which the display, the video camera, the microphone, the speaker, the codec, the communication interface and the like are integrated as one body. However, the present invention is not limited thereto and may be applied to a video conference system in which these devices are provided separately.

In the above-mentioned example, the present invention is applied to the video conference apparatus. However, the present invention may be applied to all sorts of two-way communication systems in which pictures shot at individual locations between two distant locations are transmitted to and displayed at the location of the participant being connected through a network.

According to the present invention, while watching the arrangement of the display frames on which still pictures representing the participants being frequently communicated are displayed of a large number of locations (for example, domestic and foreign branches and business places of one company) connected via the network, if the user operates the operation means of the arrangement position corresponding to the display frame on which a still picture representing the participant being communicated this time, then the user can be connected to the location of the participant being communicated and the user can start two-way communication with the participant being communicated. In consequence, there can be achieved an effect that the user can easily connect with the participant being communicated frequently in the two-way communication such as video conference system.

Also, there can be achieved an effect in which it becomes possible for the user to easily connect with the party being communicated next time by displaying a still picture captured from an image of the party being communicated on this display frame during the user is being connected with the party being communicated frequently or immediately after the connection.

Further, there can be achieved an effect in which it becomes possible for the user to easily connect with the party being communicated next time by displaying a still picture captured from an image of the party being communicated frequently on the display frame from a large number of the parties being communicated entered on the address book.

Furthermore, there can be achieved an effect in which still pictures of the parties being communicated can be displayed on these display frames even when the number of the parties being communicated frequently exceeds the number of the display frames.

It should be understood by those skilled in the art that various modifications, combinations, sub-combinations and alterations may occur depending on design requirements and other factors insofar as they are within the scope of the appended claims or the equivalents thereof.

What is claimed is:

1. A video communication apparatus for connecting with a plurality of apparatuses of participants comprising:
   circuitry configured to:
      store address information of the participants being communicated and registered;
      determine a participant among the address information to communicate with another apparatus of the participants;
      establish video communication with the another apparatus of the participants;
      arrange a plurality of display frames to represent a plurality of still pictures of the participants, each of the plurality of display frames displaying a still picture representing each participant in order of the participants being frequently communicated; and
      capture an image of the participant for selection to be communicated and to be registered for video communication, wherein
   when the plurality of still pictures of the participants being frequently communicated exceeds the plurality of display frames, the circuitry is further configured to:
      arrange the plurality of still pictures into sub-sets where a first sub-set includes a number of the plurality of the still pictures of the participants equal to a number of the plurality of display frames and each subsequent sub-set includes a number of the plurality of still pictures of the participants equal to or less than the number of the plurality of display frames, and
      display an identifier of each of the sub-sets while displaying still pictures of one of the sub-sets.

2. The video communication apparatus according to claim 1, wherein the circuitry is further configured to accept input of address information of a participant when the address information of the participant is not stored.

3. The video communication apparatus according to claim 1, wherein the circuitry is further configured to display a self image shot by a video camera.

4. The video communication apparatus according to claim 1, wherein the circuitry is further configured to allow the captured image and the address information to be edited.

5. The video communication apparatus according to claim 1, wherein the circuitry is further configured to perform a multi-point video communication with more than two apparatuses by determining respective participants of the more than two apparatuses to communicate with when still pictures of the respective participants of the more than two apparatuses are sequentially operated.

6. A video communication method for connecting with a plurality of apparatuses of participants comprising:

storing, via circuitry of a video communication apparatus, address information of the participants being communicated and registered;

determining, via the circuitry, a participant among the address information to communicate with another apparatus of the participants;

establishing, via the circuitry, video communication with the another apparatus of the participants;

arranging, via the circuitry, a plurality of display frames to represent a plurality of still pictures of the participants, each of the plurality of display frames displaying a still picture representing each participant in order of the participants being frequently communicated; and capturing, via the circuitry, an image of the participant for selection to be communicated and to be registered for video communication, wherein when the plurality of still pictures of the participants being frequently communicated exceeds the plurality of display frames, arranging includes arranging the plurality of still pictures into sub-sets where a first sub-set includes a number of the plurality of the still pictures of the participants equal to a number of the plurality of display frames and each subsequent sub-set includes a number of the plurality of still pictures of the participants equal to or less than the number of the plurality of display frames, and displaying an identifier of each of the sub-sets while displaying still pictures of one of the sub-sets.

7. The video communication method according to claim 6, further comprising:

accepting, via the circuitry, input of address information of a participant when the address information of the participant is not stored.

8. The video communication method according to claim 6, further comprising:

displaying, via the circuitry, a self image shot by a video camera.

9. The video communication method according to claim 6, further comprising:

displaying, via the circuitry, an area that allows the captured image and the address information to be edited.

10. The video communication method according to claim 6, further comprising:

performing, via the circuitry, a multi-point video communication with more than two apparatuses by determining respective participants of the more than two apparatuses to communicate with when still pictures of the respective participants of the more than two apparatuses are sequentially operated.

* * * * *